United States Patent
He et al.

(10) Patent No.: US 12,122,683 B2
(45) Date of Patent: Oct. 22, 2024

(54) METHOD AND SYSTEM FOR PREPARING LITHIUM CARBONATE FROM LITHIUM ORE

(71) Applicant: SICHUAN SIDANENG ENVIRONMENTAL PROTECTION TECHNOLOGY CO.,LTD., Chengdu (CN)

(72) Inventors: Zhi He, Chengdu (CN); Dingjiang Guo, Chengdu (CN); Jinsong He, Chengdu (CN); Chao Lui, Chengdu (CN)

(73) Assignee: Sichuan Sidaneng Environmental Protection Technology, Co., Ltd., Sichuan (CN)

( * ) Notice: Subject to any disclaimer, the term of this patent is extended or adjusted under 35 U.S.C. 154(b) by 925 days.

(21) Appl. No.: 17/051,142

(22) PCT Filed: Aug. 9, 2018

(86) PCT No.: PCT/CN2018/099548
§ 371 (c)(1),
(2) Date: Apr. 25, 2021

(87) PCT Pub. No.: WO2019/205343
PCT Pub. Date: Oct. 31, 2019

(65) Prior Publication Data
US 2021/0246043 A1    Aug. 12, 2021

(30) Foreign Application Priority Data

Apr. 28, 2018 (CN) .......................... 201810403535.1

(51) Int. Cl.
| | |
|---|---|
| *C01D 15/06* | (2006.01) |
| *B01D 61/02* | (2006.01) |
| *B01D 61/14* | (2006.01) |
| *C01D 15/08* | (2006.01) |
| *C02F 9/00* | (2023.01) |
| *C02F 1/42* | (2023.01) |
| *C02F 1/44* | (2023.01) |
| *C02F 1/52* | (2023.01) |

(52) U.S. Cl.
CPC ........... *C01D 15/08* (2013.01); *B01D 61/025* (2013.01); *B01D 61/145* (2013.01); *C02F 9/00* (2013.01); *C01D 15/06* (2013.01); *C02F 1/42* (2013.01); *C02F 1/441* (2013.01); *C02F 1/444* (2013.01); *C02F 1/52* (2013.01)

(58) Field of Classification Search
CPC .................................................... C01D 13/06
See application file for complete search history.

(56) References Cited

U.S. PATENT DOCUMENTS

2011/0200508 A1* 8/2011 Harrison ............... C01B 35/063
423/276

FOREIGN PATENT DOCUMENTS

| | | |
|---|---|---|
| AU | 2018420409 A1 | 3/2023 |
| CN | 103318925 A | 9/2013 |
| CN | 205773393 U | 12/2016 |
| CN | 205850402 U | 1/2017 |
| CN | 106044804 A | 10/2017 |
| CN | 106282557 A | 8/2018 |
| CN | 108640131 A | 10/2018 |
| JP | 2021531225 A | 11/2021 |
| KR | 20200100819 A | 8/2020 |
| WO | 2013177680 A1 | 12/2013 |
| WO | 2015058287 A1 | 4/2015 |
| WO | 2019205343 A1 | 10/2019 |

OTHER PUBLICATIONS

Examination Report for Australia Patent Application No. 2018420409, mailed Feb. 28, 2022, 5 pages.
Final Office Action for Korean Patent Application No. 10-2020-7021718, mailed May 15, 2022, 3 pages.
International Preliminary Report for International Patent Application No. PCT/CN2018/099548, mailed Nov. 3, 2020, 4 pages.
International Search Report and Written Opinion for International Patent Application No. PCT/CN2018/099548, mailed Jan. 9, 2019, 6 pages.
Notice of Acceptance for Australia Patent Application No. 2018420409, mailed Feb. 23, 2023, 4 pages.
Office Action for Korean Patent Application No. 10-2020-7021718 mailed Oct. 22, 2021, 6 pages.

* cited by examiner

*Primary Examiner* — Stuart L Hendrickson
(74) *Attorney, Agent, or Firm* — Elliott, Ostrander & Preston, P.C.

(57) ABSTRACT

Disclosed by the invention is a method for preparing lithium carbonate from lithium ore, comprising the steps of: preparing lithium sulfate leachate from lithium ore concentrate, removing $Fe^{2+}$ and $Al^{3+}$ from the lithium sulfate leachate by adding alkali, removing $Ca^{2+}$ and $Mg^{2+}$ from the lithium sulfate leachate by an ion exchange method, adding a saturated solution of soda ash into the obtained concentrated solution of lithium sulfate leachate, precipitating lithium carbonate, filtering and separating the lithium carbonate precipitate, washing with hot water and drying to obtain a finished lithium carbonate product. The invention saves the production cost, and obviously improves the purity of lithium carbonate as a final product. In addition, disclosed by the invention is also a system for realizing the method for preparing lithium carbonate from lithium ore.

13 Claims, 1 Drawing Sheet

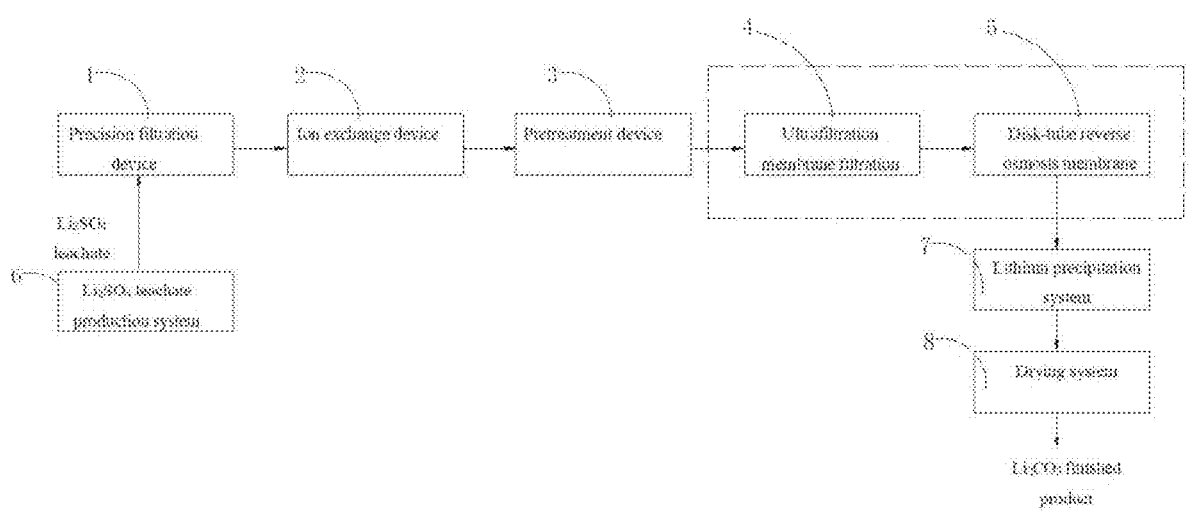

METHOD AND SYSTEM FOR PREPARING LITHIUM CARBONATE FROM LITHIUM ORE

CONTINUITY AND CLAIM OF PRIORITY

This is a U.S. national-stage patent application filed under 35 U.S.C. § 371, claiming priority to international patent application PCT/CN2018/099548 filed 9 Aug. 2018 and to Chinese patent application no. 201810403535.1 filed 28 Apr. 2018.

TECHNICAL FIELD

The invention relates to the technical field of lithium salt production process, in particular to a method and a system for preparing lithium carbonate from lithium ore.

BACKGROUND

Salt lake brine and lithium ore are main raw materials for preparing lithium carbonate. In recent years, China has actively exploited lithium resources in salt lakes, but made slow progress due to the limitation of resources and technology. So, lithium is mainly extracted from lithium ore in China. The lithium ore for this purpose generally refers to lithium-containing ores such as lithium ore, lepidolite and montebrasite.

In the prior art, the sulfuric acid process with high recovery rate is mainly used for preparing lithium carbonate from lithium ore, comprising the steps of roasting lithium ore, preparing lithium sulfate leachate, treating lithium sulfate leachate and precipitating lithium; according to the above process, purification and concentration of lithium sulfate leachate directly affect the final quality of lithium carbonate products. A series of steps adopted by most manufacturers for treating lithium sulfate leachate include impurity removal, filtration, evaporation and concentration. In particular, the impurity removal mainly refers to removing $Fe^{2+}$, $Al^{3+}$, $Ca^{2+}$, $Mg^{2+}$ and other ions from the lithium sulfate leachate by adding a large amount of alkali, which will affect the purity of the obtained lithium carbonate. So, this step is directly related to the final lithium carbonate product quality. In the prior art, the method for removing impurities by adding a large amount of alkali will affect the production benefit and cost to a certain extent, make the final impurity removal incomplete, and result in unstable quality of the lithium carbonate product.

The applicant disclosed a new process for producing lithium salt by sulfuric acid process in Chinese patent document CN106044804A, in which the impurity removal of lithium sulfate leachate was achieved mainly by the ion exchange method or nanofiltration membrane method; specifically, $Fe^{2+}$, $Al^{3+}$, $Ca^{2+}$ and $Mg^{2+}$ were removed from lithium sulfate leachate by the ion exchange method, which completely replaced the original impurity removal method by adding a large amount of alkali, and could improve the quality of lithium carbonate products to a certain extent. However, the production cost of the above method is higher than that of the method by adding alkali, and the service life of ion exchange resin used in the ion exchange method is short, which further increases the production cost. No matter whether the ion exchange time is prolonged or the amount of ion exchange resin is changed, the quality of the obtained lithium carbonate product cannot be further improved.

SUMMARY

The main purpose of the invention is to provide a method and a system for preparing lithium carbonate from lithium ore, so as to solve the problem of low product quality in the process of preparing lithium carbonate from lithium ore in the prior art.

The technical problem to be solved by the invention is to provide a method for preparing lithium carbonate from lithium ore, comprising the steps of:
1) preparing lithium sulfate leachate from lithium ore concentrate;
2) adjusting the pH value of the lithium sulfate leachate to 9-10 by adding alkali, and precipitating $Fe^{2+}$ and $Al^{3+}$ in the lithium sulfate leachate;
3) filtering the lithium sulfate leachate obtained in 2) and removing $Fe^{2+}$ and $Al^{3+}$ precipitates therefrom;
4) treating the filtered lithium sulfate leachate by an ion exchange method and removing $Ca^{2+}$ and $Mg^{2+}$ therefrom;
5) performing membrane concentration on the lithium sulfate leachate obtained by the ion exchange treatment to produce a concentrated solution of lithium sulfate leachate, wherein the concentration of $Fe^{2+}$, $Al^{3+}$, $Ca^{2+}$ and $Mg^{2+}$ in the concentrated solution is less than 0.0005%, 0.0005%, 0.0024% and 0.0040% respectively, and the concentration of lithium sulfate in the concentrated solution is 15-20%; and
6) adding a saturated solution of soda ash into the concentrated solution of lithium sulfate leachate obtained in 5), precipitating lithium carbonate, filtering and separating the lithium carbonate precipitate, washing with hot water and drying to obtain a finished lithium carbonate product.

According to the method for preparing lithium carbonate from lithium ore in the invention, $Fe^{2+}$ and $Al^{3+}$ are removed in the alkali addition process at the previous stage, which improves the purity of lithium carbonate as a final product, and avoids the loss of the exchange capacity of ion exchange resin after being oxidized in the presence of $Fe^{2+}$ and structurally changed. Then, $Fe^{2+}$ and $Al^{3+}$ precipitates are firstly filtered, which can avoid the poisoning of inorganic matters of ion exchange resin when ion exchange resin channels are blocked by these precipitates, and ensure the effectiveness of ion exchange resins. The ion exchange method is used in the later stage of the invention, which can remove $Ca^{2+}$ and $Mg^{2+}$ from the lithium sulfate leachate more thoroughly, and improve the purity of the final lithium carbonate product.

Further, the suspended matter in the lithium sulfate leachate is removed and the pH value thereof is adjusted before the lithium sulfate leachate is concentrated in 5).

Further, the membrane concentration process in 5) comprises ultrafiltration membrane filtration and reverse osmosis filtration.

In addition, disclosed by the invention is a system for preparing lithium carbonate from lithium ore, comprising a $Li_2SO_4$ leachate production system, a lithium precipitation system and a drying system. The system for preparing lithium carbonate from lithium ore comprises a precision filtration device, an ion exchange device and a membrane concentration filtration system sequentially connected, a liquid inlet of the precision filtration device is connected with a liquid outlet of the $Li_2SO_4$ leachate production system, and a concentrated solution outlet of the membrane concentration filtration system is sequentially connected with the lithium precipitation system and the drying system.

In the invention, $Li_2SO_4$ leachate is filtered by a precision filtration device for precise filtration, which shows a better filtration effect compared with the plate and frame filter in the prior art. The ion exchange resin can remove $Ca^{2+}$ and $Mg^{2+}$ with simple process and better removal effect. Then, the membrane concentration filtration system replaces the original evaporation concentration system, thus reducing the production energy consumption and improving the product quality. It can be seen that the invention reveals better treatment effect on $Li_2SO_4$ leachate, simpler structure and lower production cost compared with the prior art. The system for preparing lithium carbonate from lithium ore can realize the method for preparing lithium carbonate from lithium ore, and is suitable for the production process of lithium carbonate by the sulfuric acid process.

Further, the membrane concentration filtration system comprises an ultrafiltration membrane filtration device and at least one-stage disk-tube reverse osmosis membrane filtration device sequentially connected. The ultrafiltration membrane filtration device mainly intercepts macromolecular particulate matter, which is then concentrated in the single-stage or multi-stage disk-tube reverse osmosis membrane filtration device. The water produced by the whole system can return to the production system for use, and the concentration of $Li_2SO_4$ after concentration can reach 15-20%.

Further, the ultrafiltration membrane filtration device is capable of intercepting substances with molecular weight greater than 2000 and diameter of 0.005-0.05 m. In this case, the ultrafiltration membrane filtration device has a better interception effect on macromolecular particulate matter.

Further, the disk-tube reverse osmosis membrane filtration device is capable of intercepting substances with molecular weight of 50-150 and diameter of 0.0001-0.001 m. In this case, the disk-tube reverse osmosis membrane filtration device reveals the best concentration effect on filtered $Li_2SO_4$ leachate.

Further, the precision filtration device is capable of intercepting substances with diameter greater than 0.1 μm. In this case, most of the solid impurities in $Li_2SO_4$ leachate can be intercepted.

Further, a pretreatment device is arranged between the ion exchange device and the membrane concentration filtration system. The pretreatment device ensures the quality of liquid entering the membrane concentration filtration system.

Further, the pretreatment device comprises a primary filtration device and a pH adjustment device, which are used to control the impurity concentration and pH of $Li_2SO_4$ leachate entering the membrane concentration filtration system, and ensure a better concentration effect.

The invention will be further described in combination with drawings and preferred embodiments. Some additional aspects and advantages of the invention will be described in the following paragraphs and can be obvious through the description below or learned through the practice of the invention.

BRIEF DESCRIPTION OF DRAWINGS

The drawings described here are used for further understanding of the invention, and form a part thereof. The contents provided in the drawings and their related descriptions in the invention are used to explain the invention, but not improperly limit thereto. In the drawings:

FIG. 1 is a flow diagram of the devices relating to the method and system for preparing lithium carbonate from lithium ore of the invention.

Relevant marks in the above drawings are as follows:
1: Precision filtration device;
2: Ion exchange device;
3: Pretreatment device;
4: Ultrafiltration membrane filtration device;
5: Disk-tube reverse osmosis membrane filtration device;
6: $Li_2SO_4$ leachate production system;
7: Lithium precipitation system;
8: Drying system.

DETAILED DESCRIPTION

The invention will be clearly and completely described in combination with drawings. Those skilled in the art will be able to implement the invention based on these descriptions. Before the invention is described with reference to the drawings, it should be particularly noted that:

In the invention, the technical solutions and technical features provided in various parts, including the following description, can be combined with each other without conflict.

In addition, the embodiments of the invention referred to in the following description are generally only part of embodiments of the invention, but not all embodiments. Therefore, based on the embodiments of the invention, all other embodiments obtained by those skilled in the art without creative work shall fall within the protection scope of the invention.

With respect to terms and units in the invention, the terms "comprising", "having" and any variations thereof in the specification, claims and related parts of the invention are intended to cover non-exclusive inclusion.

The invention provides a method for preparing lithium carbonate from lithium ore, comprising the steps of:
1) preparing lithium sulfate leachate from lithium ore concentrate, wherein the specific preparation process of lithium sulfate leachate is based on the prior art, and the preparation process of lithium sulfate leachate in this specific embodiment is as follows: roasting and cooling lithium ore concentrate to obtain lithium ore calcine; grinding lithium ore calcine to obtain lithium ore powder; adding sulfuric acid into lithium ore powder, and roasting to obtain acid clinker; adding calcium carbonate into acid clinker to obtain a mixture, adding water into the mixture, and filtering when the pH value of the mixture is 5.5-6.0 to obtain lithium sulfate leachate;
2) adjusting the pH value of the lithium sulfate leachate to 9-10 by adding alkali, and precipitating $Fe^{2+}$ and $Al^{3+}$ in the lithium sulfate leachate;
3) filtering the lithium sulfate leachate obtained in 2) and removing $Fe^{2+}$ and $Al^{3+}$ precipitates therefrom;
4) treating the filtered lithium sulfate leachate by an ion exchange method and removing $Ca^{2+}$ and $Mg^{2+}$ therefrom;
5) performing membrane concentration on the lithium sulfate leachate obtained by the ion exchange treatment to produce a concentrated solution of lithium sulfate leachate, wherein the concentration of $Fe^{2+}$, $Al^{3+}$, $Ca^{2+}$ and $Mg^{2+}$ in the concentrated solution is less than 0.0005%, 0.0005%, 0.0024% and 0.0040% respectively, and the concentration of lithium sulfate in the concentrated solution is 15-20%; and
6) adding a saturated solution of soda ash into the concentrated solution of lithium sulfate leachate obtained in 5), precipitating lithium carbonate, filtering and separating the lithium carbonate precipitate, washing with hot water and drying to obtain a finished lithium carbonate product.

The suspended matter in the lithium sulfate leachate is removed and the pH value thereof is adjusted before the lithium sulfate leachate is concentrated in 5).

The membrane concentration process in 5) comprises ultrafiltration membrane filtration and reverse osmosis filtration.

The invention is described in detail below by comparing several groups of methods for preparing lithium carbonate from lithium ore and the method for preparing lithium carbonate from lithium ore in the invention:

Comparative experiment 1: Lithium sulfate leachate was prepared from lithium ore concentrate, and then only a large amount of alkali was added to the lithium sulfate leachate to remove impurities therefrom;

Comparative experiment 2: Lithium sulfate leachate was prepared from lithium ore concentrate, and then lithium carbonate leachate was purified by the ion exchange method.

Example 1: The method for preparing lithium carbonate from lithium ore of the invention was used.

Table 1 compares the experimental effects of the above three groups of experimental methods:

| Experimental method | Experimental effect | Production cost | Ion concentration of lithium sulfate leachate after impurity removal (%) |
|---|---|---|---|
| Comparative experiment 1 | The experiment could not guarantee the impurity removal effect due to complex system equipment and many process steps. | The reagent cost was a factor that must be considered. The treatment cost of this method was the highest among the three methods, which was about 240-340 yuan/ton of water. | $c_{(Fe^{2+})} < 0.0005$<br>$c_{(Al^{3+})} < 0.0005$<br>$c_{(Ca^{2+})} < 0.0027$<br>$c_{(Mg^{2+})} < 0.0045$ |
| Comparative experiment 2 | Ionic resin was prone to "iron poisoning" due to the existence of iron ions. Thus, resin was deactivated and could not be recycled, which increased the treatment cost. The resin should be treated as solid waste. | The recycling rate of resin was low, which indirectly increased the treatment cost, about 150-270 yuan/ton of water. | $c_{(Fe^{2+})} < 0.0005$<br>$c_{(Al^{3+})} < 0.0005$<br>$c_{(Ca^{2+})} < 0.0026$<br>$c_{(Mg^{2+})} < 0.0043$ |
| Example 1 | Less process steps;<br>Ensure recycling rate of the resin;<br>Impurity removal effect superior to the previous two methods. | This method could reduce the treatment cost and ensure the ion removal rate, with low risk of resin poisoning and high recycling rate. Its treatment cost was the lowest among the three methods, about 120-200 yuan per ton of water. | $c_{(Fe^{2+})} < 0.0005$<br>$c_{(Al^{3+})} < 0.0005$<br>$c_{(Ca^{2+})} < 0.0024$<br>$c_{(Mg^{2+})} < 0.0040$ |

According to Table 1, Example 1 of the invention as the best experimental effect, the lowest production cost, and the highest quality of lithium carbonate products produced from lithium sulfate leachate. The above ion concentration refers to the mass ratio of ion to lithium sulfate leachate.

In Example 1, the concentration of lithium sulfate in the concentrated solution in 5) was changed to 15%, 18% and 20% as three groups of examples, and the final experimental effect was the same as that in Example 1.

The term "precision filtration" refers to a filtration treatment process for removing fine suspended matters or colloidal particles from water that cannot be filtered by sand filtration. It is often used for water treatment as a pretreatment device for preparing ultrapure water.

The embodiment of the invention further provides a system for preparing lithium carbonate from lithium ore. As shown in FIG. 1, the system for preparing lithium carbonate from lithium ore in this specific embodiment comprises a $Li_2SO_4$ leachate production system 6, a precision filtration device 1, an ion exchange device 2, a pretreatment device 3, an ultrafiltration membrane filtration device 4, a disk-tube reverse osmosis membrane filtration device 5, a lithium precipitation system 7 and a drying system 8 that are sequentially connected.

Further, the pretreatment device 3 comprises a primary filtration device and a pH adjustment device. The precision filtration device 1 is a filtration device with filtering temperature being controlled at 50-70° C.

Preferably, the precision filtration device 1 is capable of intercepting substances with diameter greater than 0.1 μm; the ultrafiltration membrane filtration device 4 is capable of intercepting substances with molecular weight greater than 2000 and diameter of 0.005-0.05 μm; and the disk-tube reverse osmosis membrane filtration device 5 is capable of intercepting substances with molecular weight of 50-150 and diameter of 0.0001-0.001 μm.

The $Li_2SO_4$ leachate production system 6 is mainly used to obtain $Li_2SO_4$ leachate after finely grinding lithium ore concentrate, roasting, adding sulfuric acid and $CaCO_3$.

The lithium precipitation system 7 is mainly used to obtain a liquid containing lithium carbonate solid by controlling the temperature of $Li_2SO_4$ concentrated solution produced by the disk-tube reverse osmosis membrane filtration device 5 at 85-95° C. and adding saturated $Na_2CO_3$ solution. The liquid containing lithium carbonate solid is subject to solid-liquid separation and dried by the drying system 8 to obtain a $Li_2CO_3$ finished product.

Based on the system for preparing lithium carbonate from lithium ore in this specific embodiment, $Li_2SO_4$ leachate is filtered by a precision filtration device 1 for precision filtration, which showed a better filtration effect compared with the plate and frame filter in the prior art. The ion exchange resin in the ion exchange device 2 can remove $Ca^{2+}$ and $Mg^{2+}$ with simple process and better removal effect. Then, the primary filtration device and pH adjustment device as the pretreatment devices are used to control impurity concentration and pH of $Li_2SO_4$ leachate entering the membrane concentration and filtration system. Finally, the ultrafiltration membrane filter device 4 and disk-tube reverse osmosis membrane filtration device 5 replace the original evaporation concentration system, thus reducing the production energy consumption and improving the product quality.

The system for preparing lithium carbonate from lithium ore in this embodiment requires the use of ion exchange resin in the ion exchange device, which can remove $Ca^{2+}$ and $Mg^{2+}$ more thoroughly compared with the prior art. Instead of the evaporation process, the membrane concentration filtration system can reduce energy consumption and save cost, and allow the produced water to be reused in the production system. The system can be widely applied to purification and concentration treatment in the lithium salt production industry by the sulfuric acid process, reveal low operation cost and simple control, and avoid secondary pollution to the environment.

The relevant contents of the invention are as described above. Those skilled in the art will be able to implement the invention based on these descriptions. Based on the above contents of the invention, all other examples obtained by those skilled in the art without creative work shall fall within the protection scope of the invention.

The above mentioned embodiments are only preferred embodiments of the invention and not used to limit the invention. Any modification, equivalent replacement and improvement made according to the spirit and rule of the invention can be incorporated in the protection scope of the invention.

The relevant contents of the invention are as described above. Those skilled in the art are able to implement the invention based on these descriptions. The above contents of the invention can be obtained by those skilled in the art without making creative work.

We claim:

1. A system for preparing concentrated $Li_2SO_4$ leachate from lithium ore, comprising:
    a leachate production system to produce $Li_2SO_4$ leachate from lithium ore;
    a precision filtration device to remove $Fe^{2+}$ and $Al^{3+}$ from the $Li_2SO_4$ leachate and produce a filtered $Li_2SO_4$ leachate;
    an ion exchange device to remove $Ca^{2+}$ and $Mg^{2+}$ from the filtered $Li_2SO_4$ leachate and produce a deionized $Li_2SO_4$ leachate; and
    a membrane concentrator to produce the concentrated $Li_2SO_4$ leachate from the deionized $Li_2SO_4$ leachate wherein the membrane concentrator comprises an ultrafiltration membrane filtration device followed by a disk-tube reverse osmosis membrane filtration device.

2. The system of claim 1, further comprising:
    a pretreatment device to ensure a quality of the deionized $Li_2SO_4$ leachate entering the membrane concentrator; wherein the pretreatment device comprises:
    a primary filtration device to control an impurity concentration of the deionized $Li_2SO_4$ leachate entering the membrane concentrator; and
    a pH adjustment device to control a pH of the deionized $Li_2SO_4$ leachate entering the membrane concentrator.

3. The system of claim 1 wherein the disk-tube reverse osmosis membrane filtration device is a single stage device.

4. The system of claim 1 wherein the ion exchange device removes $Ca^{2+}$ and $Mg^{2+}$ from the filtered $Li_2SO_4$ leachate by a process comprising:
    exposing the filtered $Li_2SO_4$ leachate to an ion exchange resin.

5. The system of claim 1 wherein the filtered $Li_2SO_4$ leachate has a concentration of $Fe^{2+}$ of less than 0.005% and a concentration of $Al^{3+}$ of less than 0.005%.

6. The system of claim 1 wherein the deionized $Li_2SO_4$ leachate has a concentration of $Ca^{2+}$ of less than 0.0024% and a concentration of $Mg^{2+}$ of less than 0.0040%.

7. The system of claim 1 wherein the disk-tube reverse osmosis membrane filtration device is a multi-stage device.

8. The system of claim 1 wherein the ultrafiltration membrane filtration device is operative to intercept substances with molecular weight greater than 2000 and diameter of 0.005-0.05 μm.

9. The system of claim 1 wherein the disk-tube reverse osmosis membrane filtration device is operative to intercept substances with molecular weight 50-150 and diameter of 0.0001-0.001 μm.

10. The system of claim 1, wherein the membrane concentrator emits concentrated $Li_2SO_4$ leachate having a concentration of at least 15%.

11. The system of claim 1, wherein the membrane concentrator emits concentrated $Li_2SO_4$ leachate having a concentration between 15% and 20%.

12. The system of claim 1 wherein the precision filtration device removes $Fe^{2+}$ and $Al^{3+}$ from the $Li_2SO_4$ leachate by a process comprising:
    adding alkali to adjust a pH of the $Li_2SO_4$ leachate and cause precipitation of the $Fe^{2+}$ and $Al^{3+}$; and
    filtering the $Fe^{2+}$ and $Al^{3+}$ precipitates to produce the filtered $Li_2SO_4$ leachate.

13. The system of claim 12 wherein adding alkali to adjust the pH of the $Li_2SO_4$ leachate is adding alkali to adjust the pH of the $Li_2SO_4$ leachate to between 9 and 10.

* * * * *